US012632555B1

(12) United States Patent (10) Patent No.: US 12,632,555 B1

Serebrin (45) Date of Patent: May 19, 2026

(54) VIRTUAL MACHINE ATTESTATION REPORT ENHANCEMENT VIA COUNTERSIGNING

(71) Applicant: Amazon Technologies, Inc., Seattle, WA (US)

(72) Inventor: Benjamin Serebrin, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 334 days.

(21) Appl. No.: 18/192,178

(22) Filed: Mar. 29, 2023

(51) Int. Cl.
 *G06F 21/57* (2013.01)
 *G06F 9/455* (2018.01)
 *G06F 21/53* (2013.01)

(52) U.S. Cl.
 CPC .......... *G06F 21/57* (2013.01); *G06F 9/45558* (2013.01); *G06F 21/53* (2013.01); *G06F 2009/45587* (2013.01)

(58) Field of Classification Search
 None
 See application file for complete search history.

(56) References Cited

U.S. PATENT DOCUMENTS

| | | | | |
|---|---|---|---|---|
| 10,454,689 B1 * | 10/2019 | Sharifi Mehr | ........ | H04L 63/166 |
| 2007/0220259 A1 * | 9/2007 | Pavlicic | ................ | H04L 9/3297 |
| | | | | 713/176 |
| 2011/0296191 A1 * | 12/2011 | Mouille | .................. | H04L 9/321 |
| | | | | 713/176 |
| 2015/0254451 A1 * | 9/2015 | Doane | ..................... | G06F 21/44 |
| | | | | 726/1 |
| 2019/0260594 A1 * | 8/2019 | Singhal | ................... | H04L 63/06 |
| 2020/0329464 A1 * | 10/2020 | Madapoosi Sampath | ................... | |
| | | | | H04W 72/53 |
| 2020/0371828 A1 * | 11/2020 | Chiou | ................. | G06F 11/0793 |
| 2021/0243612 A1 * | 8/2021 | Kempf | ................. | H04W 28/18 |
| 2022/0391523 A1 * | 12/2022 | Kwong | ............... | G06F 21/6218 |
| 2024/0289155 A1 * | 8/2024 | Shaw | .................. | G06F 9/45558 |

OTHER PUBLICATIONS

Kaplan, David. Protecting VM Register State with SEV-ES, Feb. 17, 2017. https://www.amd.com/system/files/TechDocs/Protecting%20VM%20Register%20State%20with%20SEV-ES.pdf, 8 pages.
SEV-ES Guest-Hypervisor Communication Block Standardization, Advanced Micro Devices, Publication #5641, Revision 2.01, Issue date Jul. 2022. https://developer.amd.com/wp-content/resources/56421.pdf, downloaded on Jan. 30, 2023, 64 pages.

* cited by examiner

*Primary Examiner* — Raqiul A Choudhury

(74) *Attorney, Agent, or Firm* — Nicholson DeVos Webster & Elliott LLP

(57) ABSTRACT

Techniques for virtual machine attestation report enhancement via countersigning are described. Upon receiving an attestation report signed by a security processor of a computing device hosting a guest virtual machine in a cloud provider system, the hypervisor can countersign the attestation report to provide further assurance as to the legitimacy of the attestation report and the presence of the computing device within a legitimate data center of the cloud provider.

20 Claims, 10 Drawing Sheets

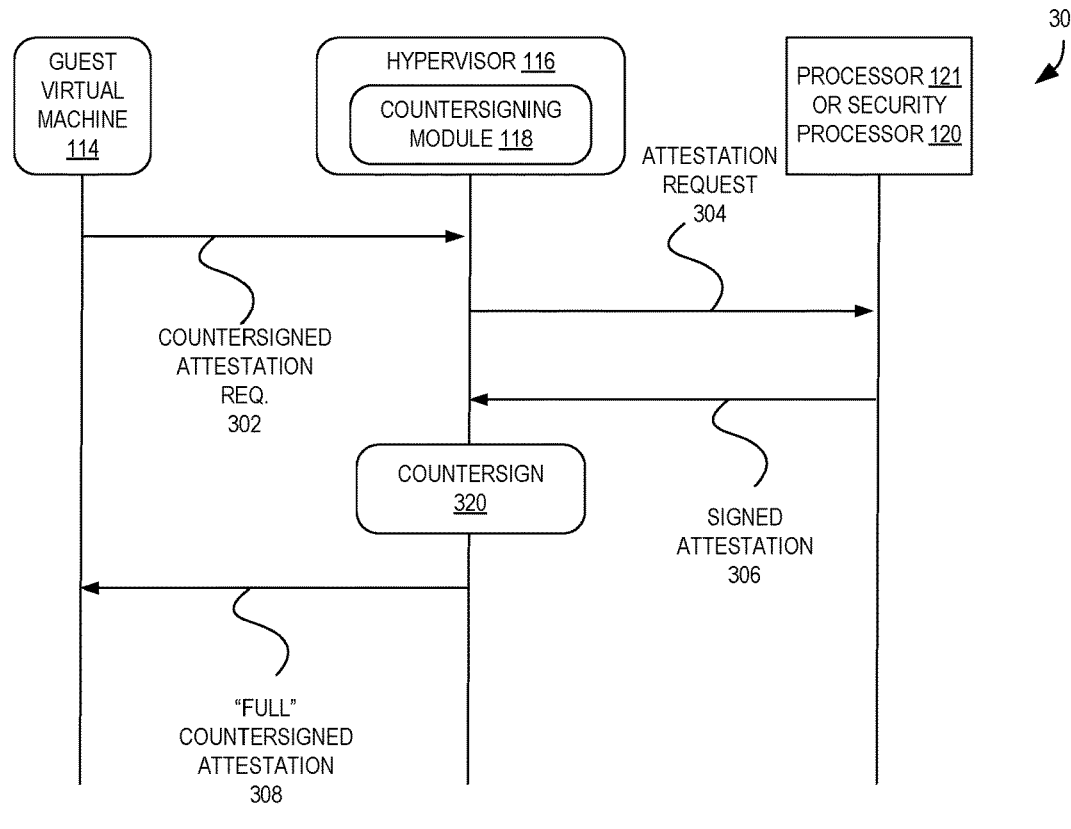
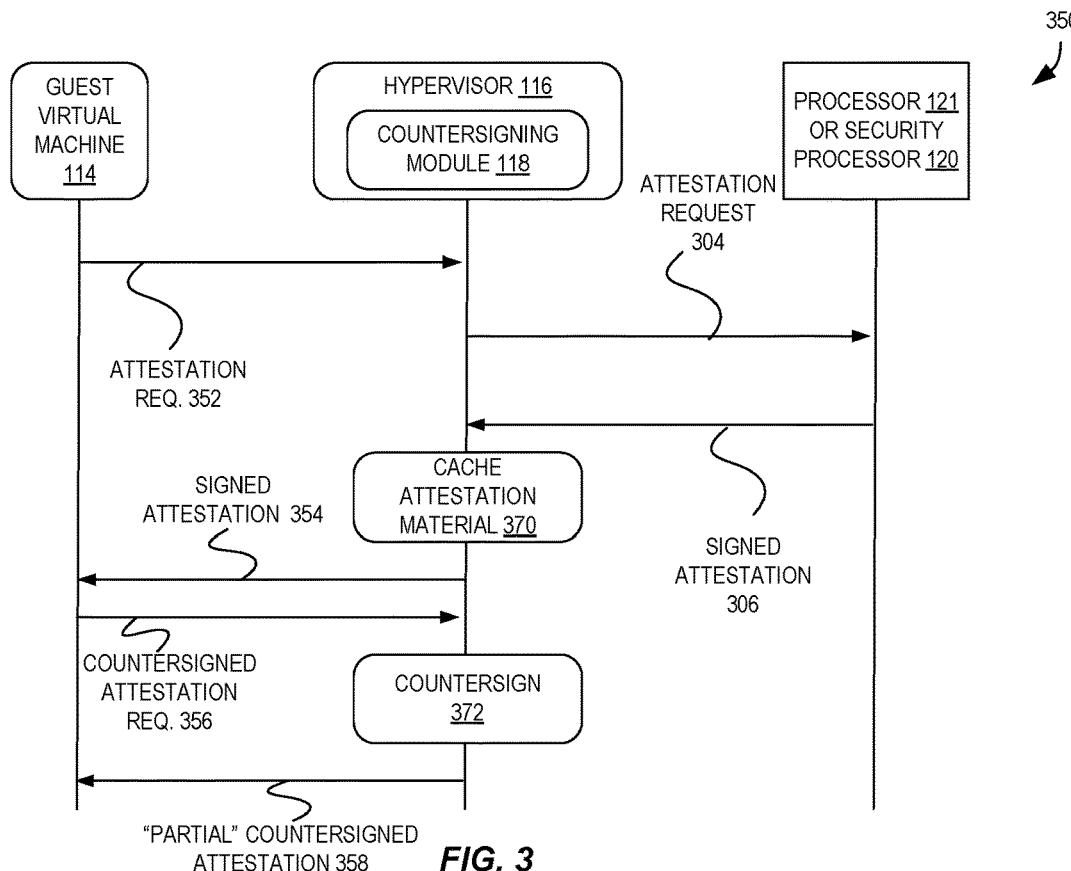
*FIG. 3*

COUNTERSIGNED
ATTESTATION
REPORT 634

SIGNED
ATTESTATION
REPORT 630

ATTESTATION DATA 602

HASH 604

(SECURITY) PROCESSOR SIGNATURE 606

VM CONFIGURATION DATA 610

HASH 608

CLOUD PROVIDER SIGNATURE 612

THIRD-PARTY ATTESTATION DATA 615

HASH 614

THIRD-PARTY SIGNATURE 616

(CLOUD
PROVIDER)
SIGNATURE
BLOCK 632

THIRD-PARTY
SIGNED
COUNTERSIGNED
ATTESTATION
REPORT 640

OPERATIONS
700

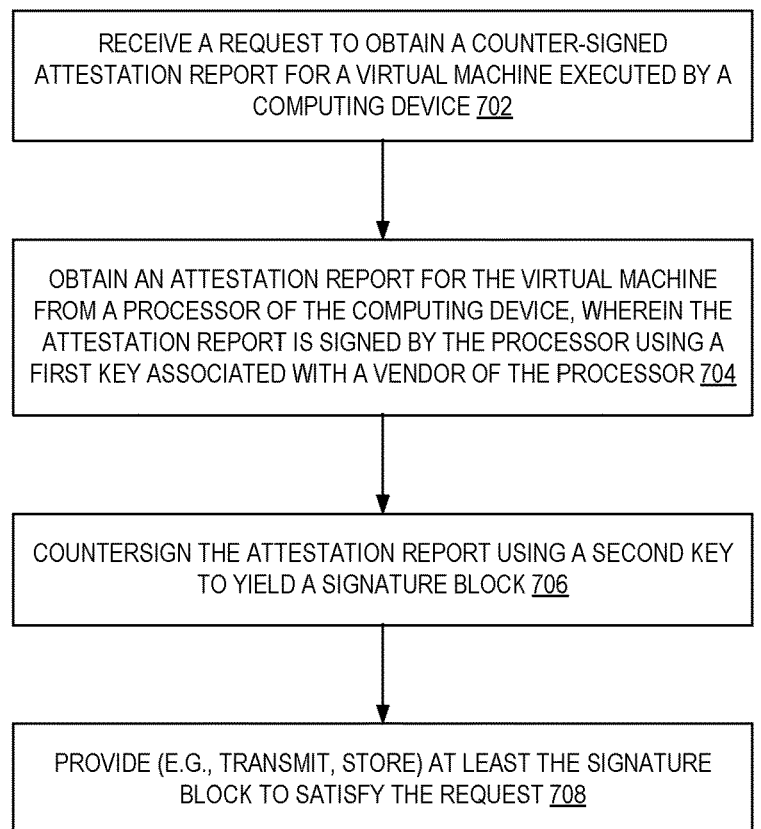

RECEIVE A REQUEST TO OBTAIN A COUNTER-SIGNED ATTESTATION REPORT FOR A VIRTUAL MACHINE EXECUTED BY A COMPUTING DEVICE 702

OBTAIN AN ATTESTATION REPORT FOR THE VIRTUAL MACHINE FROM A PROCESSOR OF THE COMPUTING DEVICE, WHEREIN THE ATTESTATION REPORT IS SIGNED BY THE PROCESSOR USING A FIRST KEY ASSOCIATED WITH A VENDOR OF THE PROCESSOR 704

COUNTERSIGN THE ATTESTATION REPORT USING A SECOND KEY TO YIELD A SIGNATURE BLOCK 706

PROVIDE (E.G., TRANSMIT, STORE) AT LEAST THE SIGNATURE BLOCK TO SATISFY THE REQUEST 708

*FIG. 7*

VIRTUAL MACHINE ATTESTATION REPORT ENHANCEMENT VIA COUNTERSIGNING

BACKGROUND

Cloud computing platforms often provide on-demand, managed computing resources to users. Such computing resources (e.g., compute and storage capacity) are often provisioned from large pools of capacity installed in data centers of a cloud computing provider. Users can request computing resources from the "cloud," and the cloud can provision compute resources to those users. Technologies such as virtual machines and containers are often used to allow users to securely share the capacity of computer systems.

To provide virtual machine functionalities (and other dependent services) to its users, cloud providers make use of technologies to ensure the security and confidentiality of user data. For example, cloud providers may protect data in-use with hardware-based Trusted Execution Environment (TEE or HW-TEE) technologies.

TEEs are secure and isolated environments that prevent unauthorized access or modification of applications and data while they are in use. TEEs are often used by governments, enterprises, and cloud service providers to enable the secure handling of confidential information on mobile devices and server infrastructure. The TEE offers a level of protection against software attacks and can assist in the control of access rights. Through utilizing the functionality and security levels offered by the TEE, governments and enterprises can be assured that employees using their own devices are doing so in a secure and trusted manner. Likewise, server-based TEEs help defend against internal and external attacks against backend infrastructure.

Guest virtual machine attestation helps users confirm that their virtual machine is running on a hardware-based TEE with security features enabled for isolation and integrity. Guest attestation can be used to ensure a virtual machine runs on an expected confidential hardware platform (e.g., AMD's SEV-SNP), verify whether a virtual machine has "secure boot" enabled, which protects components of the virtual machine (such as its firmware, boot loader, kernel, etc.) from attacks or malware, and/or obtain evidence that the virtual machine in fact is running on known secure hardware.

BRIEF DESCRIPTION OF DRAWINGS

Various examples in accordance with the present disclosure will be described with reference to the drawings, in which:

FIG. 3 is a diagram illustrating single message and dual message approaches for virtual machine attestation report enhancement via countersigning according to some examples.

FIG. 7 is a flow diagram illustrating operations of a method for virtual machine attestation report enhancement via countersigning according to some examples.

DETAILED DESCRIPTION

Figure 1:
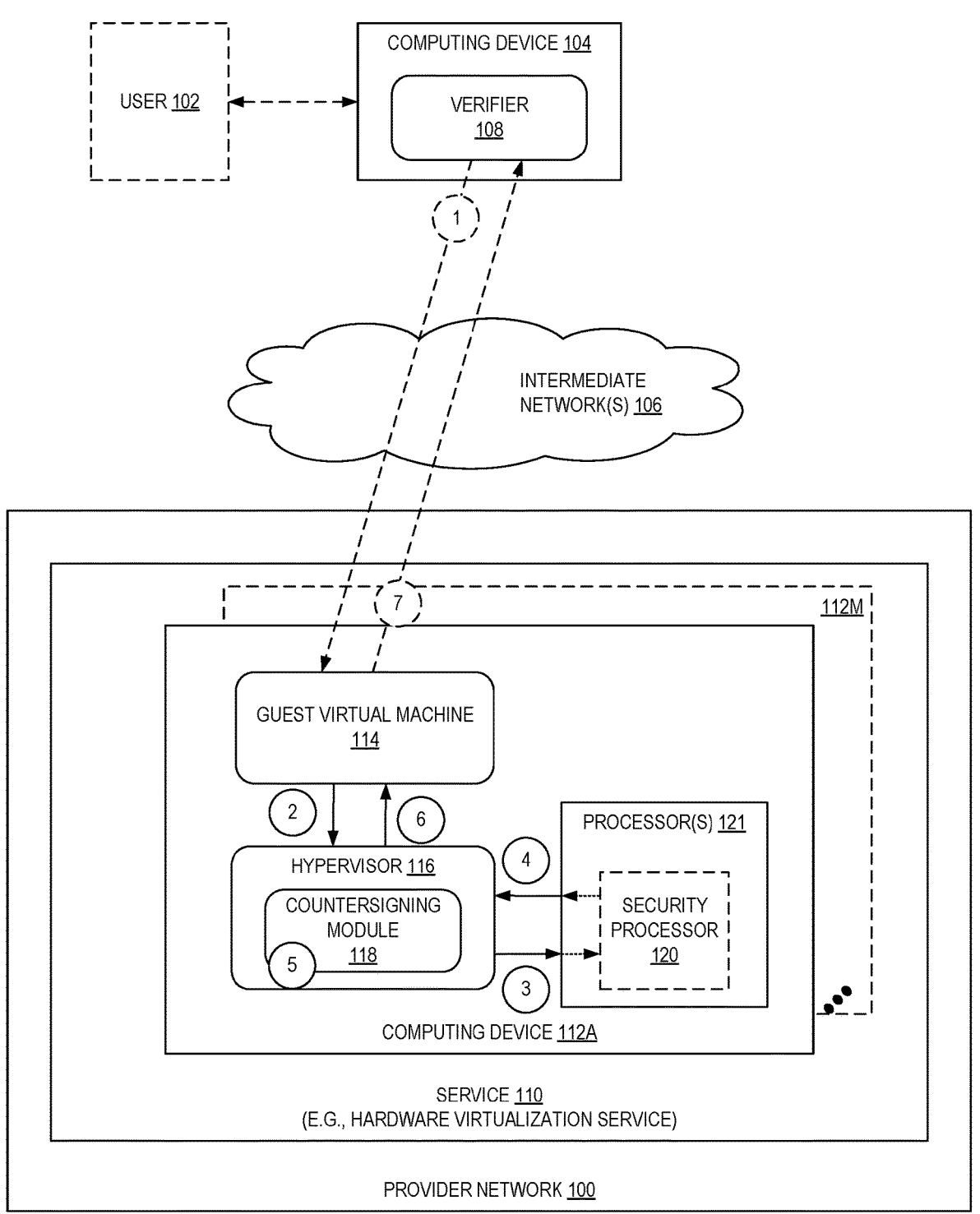
FIG. 1 is a diagram illustrating an environment for virtual machine attestation report enhancement via countersigning according to some examples.

The present disclosure relates to methods, apparatus, systems, and non-transitory computer-readable storage media for virtual machine attestation report enhancement via countersigning. According to some examples, an attestation report signed by a secure processor (of a hardware manufacturer) can be countersigned by an operator (such as a cloud provider) to effectively provide an assurance that the attestation report was generated by a device in an authentic datacenter of the cloud provider, under the control of the cloud provider, at an indicated time, etc. Accordingly, a cloud provider countersigned attestation report can provide further assurances to an owner of the guest virtual machine about the attestation itself, further reducing the likelihood of it being fraudulent.

The relatively new technology involving hardware-confidential computing, which includes HW-TEEs (hardware trusted execution environments) that aim to provide an isolation layer to protect a cloud customer's virtual machines from being observed or modified by the cloud provider, or by other individuals or entities. Part of this technology includes the use of attestation reports: often a cryptographic hash of the initial guest virtual machine state (e.g., memory, isolation properties), signed by the CPU's secret processing microcontroller (or "secure processor"). This provides assurance that the CPU vendor provides statements about the integrity of the guest virtual machine. However, such attestation reports lack certain valuable information, such as the geographic location of the device (e.g., in an authentic cloud provider datacenter).

Examples disclosed herein provide a cloud provider-added attestation in the form of a cloud provider countersigned attestation report. When an attestation report is transferred via the hypervisor (from the secure processor, on its way back to the guest virtual machine), in some examples the hypervisor adds a cloud-provider associated signature on the attestation report as well, providing whatever additional assurances the cloud provider desires. For example, the countersigned block can include assurances that the guest virtual machine (and thus, the generator of the attestation report itself) is within a computing device in an authentic datacenter of the cloud provider (which includes an implication of physical security), an assurance of when the attestation report was generated and/or obtained by the hypervisor (e.g., via timestamping), etc.

In some examples, a new globally unique identifier (GUID) is added to the Guest Hypervisor Communication Block (GHCB) via being published by the cloud provider. This new GUID can be used by a guest virtual machine to indicate a request for a counter-signed attestation report. This desired report could be either the full attestation report generated by the hardware (e.g., secure processor) with a cloud-provider-appended signature block, or alternatively just the cloud-provider signature block that contains a signature on another attestation report, such as the most-recently-requested attestation report.

In some examples, signing credentials to be used for cloud-provider signatures can be provisioned to multiple computing devices (e.g., to a software hypervisor, or a dedicated offload card providing hypervisor functionalities) in a cloud provider's datacenter that may host customer virtual machines and may need to provide such attestations. In some examples, a separate more logically centralized entity (e.g., a signing service or application executed by other computing devices, such as via an on-demand code execution service) may sign attestation reports on behalf of the cloud-provider.

Such techniques can also be used to reduce the likelihood of malicious actors from being able to generate fraudulent attestation reports and pass them off as being legitimate. Even if a malicious actor were to somehow obtain a key used by the security processor to sign a fraudulent attestation report, this fraudulent attestation report would not have a cloud provider network signature block, which could be detected by the end user. Thus, in addition to somehow compromising the security processor, an attacker would also need to somehow comprise the cloud provider's infrastructure itself to be able to generate fraudulent cloud provider network signature blocks, which significantly increases the difficulty.

FIG. 1 is a diagram illustrating an environment for virtual machine attestation report enhancement via countersigning according to some examples. In some examples, attestation report enhancement via countersigning involves computing devices of a cloud provider network 100 that host, or execute, virtual machines for users of the cloud provider network 100.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host can have an IP address in the substrate network. Hardware virtualization technology can enable multiple operating systems to run concurrently on a host computer, for example as VMs on the host. A hypervisor, or virtual machine monitor (VMM), on a host allocates the host's hardware resources amongst various VMs on the host and monitors the execution of the VMs. Each VM can be provided one or more IP addresses in the overlay network, and the VMM on a host can be aware of the IP addresses of the virtual machines on the host. The VMMs (and/or other devices or processes on the network substrate) can use encapsulation protocol technology to encapsulate and route network packets (e.g., client IP packets) over the network substrate between virtualized resources on different hosts within the cloud provider network. The encapsulation protocol technology can be used on the network substrate to route encapsulated packets between endpoints on the network substrate via overlay network paths or routes. The encapsulation protocol technology can be viewed as providing a virtual network topology overlaid on the network substrate. The encapsulation protocol technology can include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device (or "computing device"). Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service 110 that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Another type of managed compute service can be a container service, such as a container orchestration and management service (referred to in various implementations as a container service, cloud container service, container engine, or container cloud service) that allows users of the cloud provider network to instantiate and manage containers. In some examples the container service 114 can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As described herein, a relatively new offering from processor vendors referred to as hardware confidential computing, which may also be referred to as HW-TEE. For example, AMD® provides a technology referred to as Secure Encrypted Virtualization (SEV), involving a variety of techniques such as Secure Memory Encryption (SME) that uses a single key to encrypt system memory, Secure Encrypted Virtualization (SEV) that uses one key per virtual machine to isolate guests and the hypervisor from one another, and Secure Encrypted Virtualization-Encrypted State (SEV-ES), which encrypts all CPU register contents when a VM stops running to prevent the leakage of information in CPU registers to components like the hypervisor and can detect malicious modifications to a CPU register state. As another example, Intel® provides Trust Domain Extensions (TDX) that use new architectural elements to help deploy hardware-isolated, virtual machines called trust domains (TDs), which is designed to isolate VMs from the virtual-machine manager (VMM)/hypervisor and any other non-TD software on the platform to protect TDs. Further, ARM® provides Confidential Compute Architecture (CCA) to protect data and code via a series of hardware and software architecture innovations to provide support for confidential computing.

These various approaches address a same goal in varying ways, by providing a set of isolation mechanisms such that a guest virtual machine doesn't have to rely on the hypervisor, and thus, the hypervisor can even be considered untrustworthy or adversarial. Commonly, the guarantees it provides are that the guest's memory is not visible or tamperable by the hypervisor (or any other guest state, such as registers), and that guests are isolated from each other as well.

Additionally, many of these systems provide a kind of attestation in which a cryptographic digest of the state that the guest is in, signed by an authority that's rooted in the processor itself. For example, a processor may provide an attestation providing a cryptographic hash of the guest virtual machine's memory before it started running, potentially along with information such indications of policies applied to the guest, such as whether "debug mode" is or isn't enabled, etc.

With these attestation reports, the guest VM's owner can determine that the chip manufacturer has provided their "stamp of approval" that their hardware is running, that it is authentic hardware, and that their hardware is promising that the guest virtual machines cannot be tampered with. Accordingly, these attestation reports are rooted in a secret that's "inside" the CPU, e.g., that can be used to derive signing material and sign an attestation (e.g., using asymmetric RSA or ECC). Additionally, there is also a certificate involved that is public, which is used to effectively provide the public key that corresponds to that secret, where the chip vendor has signed the certificate.

In some implementations, each processor from a vendor could have an independent certificate (e.g., a public-private key pair) either stored/embedded in the processor or dynamically obtained (e.g., from a server of the vendor). While this works, it does not work well in a cloud provider context if the cloud provider does not want its users to be able to fingerprint the exact computing devices its virtual machines are running on—which could assist in potentially malicious activity by providing visibility into what other instances or applications may be running on the computing device, whether they have run an instance on that particular computing device before, etc.—and using a different certificate per computing device could allow this.

Figure 2:
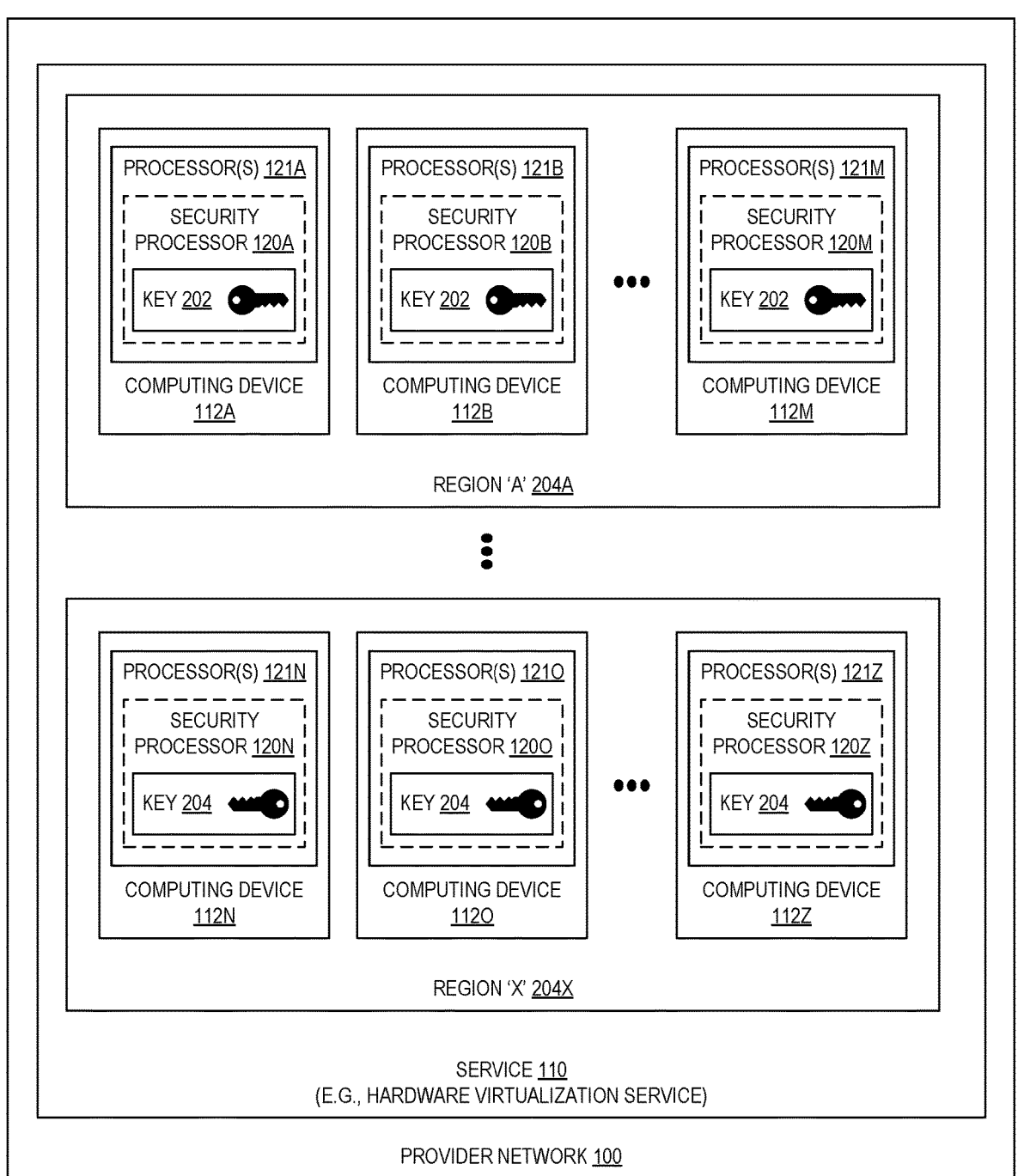
FIG. 2 is a diagram illustrating shared security processor key utilization in a cloud provider network according to some examples.

Accordingly, in some examples a processor's certificate could be deployed to multiple such computing devices (or, processors) used by a cloud provider. Turning ahead, FIG. 2 is a diagram illustrating shared security processor key utilization in a cloud provider network according to some examples. As shown, a same certificate could be used by all computing devices in a particular data center, or in a particular AZ or region of the cloud provider. In this illustrated example, a same key 202 is used by security processors 120A-120M within a first region 'A' 204A, while a different key 204 is used by security processors 120A-120M within a first region 'B' 204B. Thus, as many devices use a same certificate, knowledge of the involved certificate/key used for an attestation does not serve as a fingerprint, as it may only identify a particular region or AZ, for example, which the customer already knows.

However, while this arrangement solves the device fingerprinting problem, it introduces another issue. If the private key is compromised, in theory a malicious actor could—although via a difficult attack path—product illegitimate attestation reports for a potentially large number of computing devices (instead of just a single device) that would all appear to be signed by the processor vendor. Thus, if an attacker could intercept traffic on any affected device, the attacker may be able to create and sign illegitimate attestation reports and inject those illegitimate attestation reports back into the traffic, potentially hiding some other malicious activity and/or causing chaos.

Embodiments herein can prevent such attacks involving fraudulent attestation reports via countersigning techniques described herein. For example, a countersigning module 118 (e.g., a software component of a hypervisor 116) can be adapted to countersign an attestation report (that itself is already signed) using a certificate that is chainable to the cloud provider itself, adding an additional layer of security to the attestation bundle.

For example, turning back to FIG. 1, upon the launch of a guest virtual machine 114, the associated user 102 (or customer of provider network 100) may wish to use a verifier 108 program (typically executed by another computing device 104 outside the provider network 100, such as on a personal computer or an on-premise computing device) to "verify" that the execution of this guest virtual machine 114 appears secure and adheres to the desired properties of the user 102. A verifier 108, such as a remote boot attestation and runtime integrity measurement software that can securely bootstrap secrets, can implement a remote boot attestation and runtime integrity measurement. As part of this functionality, the verifier 108 may seek to examine an attestation report generated for a guest virtual machine 114 to ensure it is signed properly and indicates the correct, desired operation and configuration of the guest virtual machine 114.

Thus, as shown at circle (1), either the user 102 (via computing device 104) or verifier 108 may send a request to obtain at attestation report associated with a guest virtual machine 114. This request may be sent to the guest virtual machine 114 itself (as shown), or may be sent to a service of the provider network (e.g., an object storage service storing an attestation report, a hardware virtualization service that manages the execution of the virtual machine, etc.). Thus, it is to be appreciated that in various examples, at the time of this request the attestation report may or may not have already been created; for the purpose of this example, we will assume that the attestation report will be generated synchronously with (e.g., responsive to) this request.

At circle (2), the guest virtual machine 114 may issue a command or request for a countersigned attestation report. As one example, in one deployment using a processor 121 from AMD™, a guest virtual machine 114 can communicate with the hypervisor 116 using a specified interface referred to as the GHCB (Guest Host Communication Block). Through this channel, a guest virtual machine 114 can instruct the hypervisor 116 to perform various actions, such as sending a message/command to a security processor 120 (e.g., continuing the AMD example, a Platform Security Processor (PSP)) component of the processor 121, which could be an instruction seeking a signed attestation report. However, in other implementations, a security processor 120 may or may not be used or available; for example, in some examples the processor 121 itself can generate a signed attestation report (e.g., by executing in a special secure operating mode, such as an enclave).

The GHCB is defined in a flexible manner to allow for additional message types to be defined using new GUID (Globally Unique Identifier) values. In some examples, a cloud provider can define a new GUID that is associated with a request for a provider network counter-signed attestation report.

Upon receipt of such a request (including this GUID), the hypervisor 116 may determine that the guest virtual machine 114 is seeking such a provider network counter-signed attestation report and send a request at circle (3) for a "regular" signed attestation report commonly generated by the security processor 120 or processor 121. The security processor 120 (or processor 121) may then generate such an attestation report (known to those of skill in the art) and return this signed attestation report at circle (4) to the hypervisor 116.

Notably, this attestation report is signed by the processor 121—e.g., a hash of the attestation report body is generated and then signed using the processor vendor's private key—and thus the signed attestation report itself cannot be modified by the hypervisor 116 without corrupting the signature/hash.

However, the hypervisor 116 can generate its own signature of the attestation report at circle (5) (e.g., by signing a hash (e.g., a SHA-2 family hash such as a SHA-256 or SHA-512 hash) of the attestation report body, the entire attestation report package, etc.) and potentially appending data including this signature (e.g., a hash, a result of encrypting the hash with its private key, and possibly other information such as the corresponding public key, configuration data, and the like) to this already-signed attestation report, yielding a cloud provider countersigned attestation report, which can be passed back to the guest virtual machine 114 at circle (6), and subsequently provided back to the verifier at circle (7).

However, other arrangements are also possible, such as wherein the cloud provider countersigned attestation report can be stored to a storage location (e.g., a folder or bucket of an object storage service, to a directory location of the guest virtual machine 114, etc.) and retrieved by the verifier 108 or proactively sent by the guest virtual machine 114 to the verifier 108, etc.

As another example, in some examples the processor 121 or security processor 120 can more directly provide a signed attestation report back to the guest virtual machine 114, e.g., without involving the hypervisor 116. In such examples, the system can be adapted in other ways to allow the guest virtual machine 114 to obtain a countersigned attestation report (or block), such as by the guest virtual machine 114 sending a request report to the hypervisor 116 for a countersignature. In some examples, the request can include the signed attestation. As another example, the hypervisor 116 can obtain a duplicate of the signed attestation report directly from the processor 121 or security processor 120, which provides strong data provenance assurance, and then countersign this signed attestation report. In yet other examples, before the processor 121 or security processor 120 returns a signed attestation report to the guest virtual machine 114, it can obtain a countersignature, from the hypervisor 116, and then provide both the signed attestation report and the (cloud-provider) countersignature block more directly to the guest virtual machine 114.

Thus, with a verifier 108 that has been updated to be able to understand and parse a cloud provider countersigned attestation report, the verifier 108 can (in addition to analyzing the signed attestation report as normal) detect the existence of the cloud provider signature (and optional additional information, described elsewhere herein) and verify that the signed attestation report was countersigned by the cloud provider, providing additional guarantees about the legitimacy, associated location, time, etc., of the generation of the signed attestation report by the security processor 120. This information can be provided to the user 102, used in further software automations, etc., to allow for confident use of the guest virtual machine 114.

As indicated herein, the guest virtual machine 114 can send a message to the hypervisor 116 seeking a countersigned attestation report. This can be implemented in a variety of ways. FIG. 3 is a diagram illustrating single message approach 300 and a dual message approach 350 for virtual machine attestation report enhancement via countersigning according to some examples.

As shown with the single message approach 300, in some examples the guest virtual machine 114 can submit a single request 302 for a countersigned attestation report to the hypervisor 116, whereby the hypervisor 116 can send a request 304 for a signed attestation report to the security processor 120, receive the signed attestation report via 306, perform a countersigning 320 process as described herein, and provide a "full" countersigned attestation 308 back to the guest virtual machine 114 that includes both the signed attestation report (from the security processor 120) and the cloud provider countersigned block.

In contrast, another approach involving multiple messages is shown at 350. Here, the guest virtual machine 114 can send a "regular" request 352 for a typical signed attestation report, resulting in the same sending of a request 304 for a signed attestation report to the security processor 120 and subsequent receipt of the signed attestation report via 306. However, in this example, the hypervisor 116 (e.g., the countersigning module 118 itself) may cache some or all of this report—e.g., an identifier of the attestation report together with the hash, or the entire attestation report—at block 370 and return this sign attestation report via message 354.

Thereafter, the guest virtual machine 114 may seek just the cloud provider countersigning material, and send a request 350 for the countersigned attestation data. Upon receipt (or even prior to receipt), the hypervisor 116 can countersign the cached attestation material 370 and provide it (on its own) back as partial countersigned attestation message 358 (e.g., including just a hash and signature). In some examples, such a request 356 will only be able to obtain countersigned attestation material for a most recent attestation report, in which the hypervisor 116 only needs to cache information for a most-recent attestation report. Alternatively, in some examples, the guest virtual machine 114 may be able to provide an identifier of an attestation of interest, which can be used by the hypervisor 116 to identify which attestation report it is supposed to return a countersigned block for (e.g., by using the identifier as a lookup key to identify the corresponding cached attestation material 370, which it can use to create the requested countersigned material).

Figure 4:
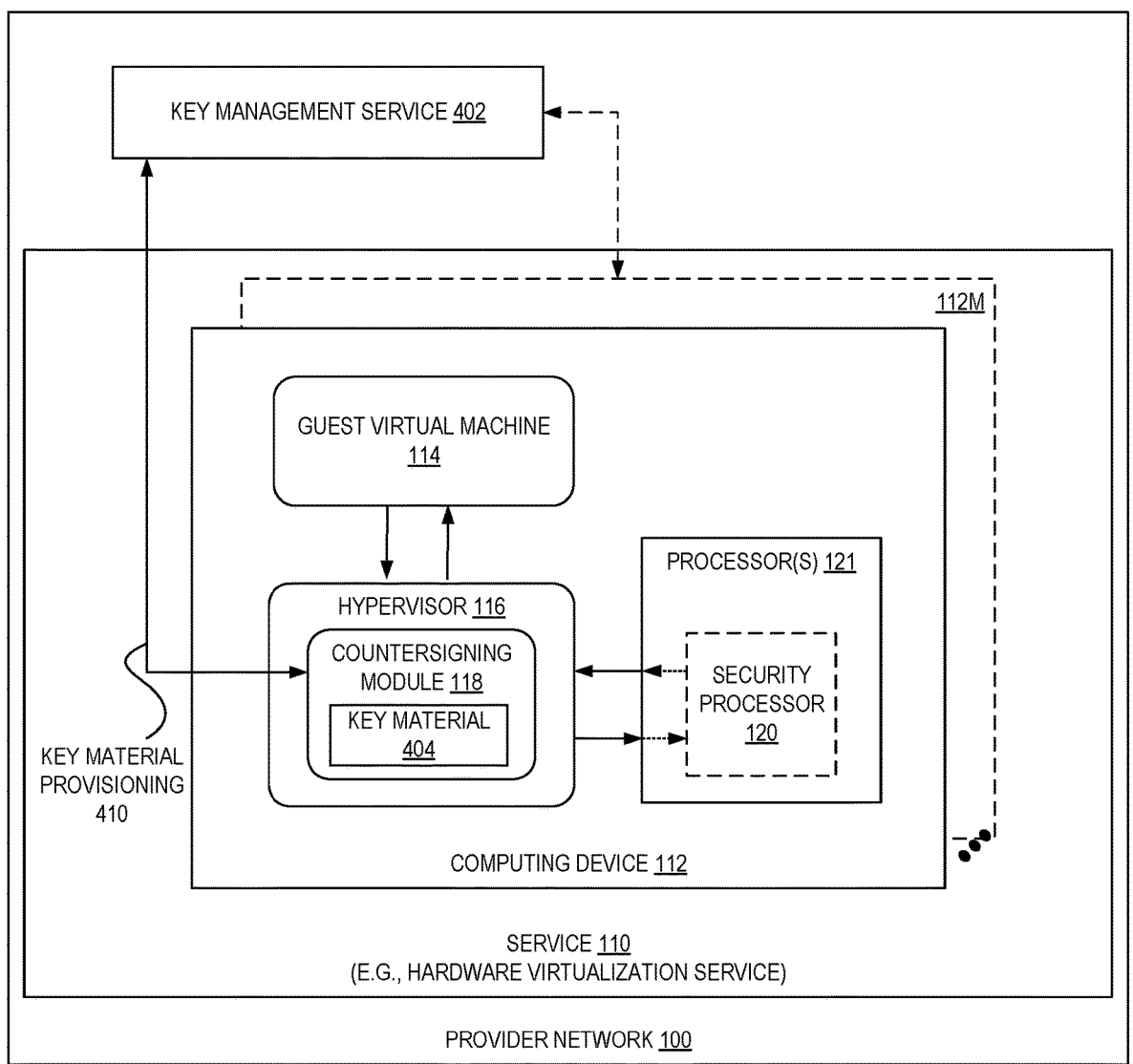
FIG. 4 is a diagram illustrating cloud provider attestation signing key management for virtual machine attestation report enhancement via countersigning according to some examples.

As described, in some examples the countersigning module 118 of the hypervisor 116 can perform the countersigning "locally," that is, on the computing device 112. For example, FIG. 4 is a diagram illustrating cloud provider attestation signing key management for virtual machine attestation report enhancement via countersigning according to some examples. As is described, the countersigning module 118 may sign the attestation (e.g., sign a hash of the attestation report) using key material 404 such as a private key corresponding to a public key, together making up a certificate, which can be chained back to a certificate authority (e.g., of the provider network) that issued the certificate. To obtain such key material 404, in some embodiments the countersigning module 118 can generate such a key pair on its own using libraries known to those of skill in the art, though in some examples the countersigning module 118 can communicate with a key management service 402 (e.g., of the provider network 100) to provision the key material as shown by 410. A key management service 402, such as AWS® Key Management Service (KMS), allows users/ clients the ability to create, manage, and control cryptographic keys across various applications and services. The key management service 402 may even be able to publish public keys. In such cases, the key management service 402 can be configured to generate key material 404 (e.g., public-private keypair) and securely provision a unique key material 404 for each computing device 112, or securely provision a same key material 404 for multiple computing devices 112, e.g., a set of computing devices that host customer instances that are in a same AZ or region of the provider network 100 (e.g., to maintain the anti-fingerprinting property), etc. This key material 404 can be securely stored, e.g., in a software or hardware Trusted Platform Module (TPM) or the like. With this provisioning of key material 404, these computing devices can generate countersigned attestation report material locally in a straightforward manner.

In other embodiments, other types of keys can be used to maintain the oft-desired anti-fingerprinting property while still allowing different keys to be provisioned to different computing devices 112. For example, various techniques exist whereby different private keys can be used in a manner that does not fingerprint the user, such as the Enhanced Privacy ID (EPID) system from Intel™, the Direct Anonymous Attestation (DAA) algorithm, or the like. In some such systems, different private keys can be used by different encrypting devices but a common group public verification key can be associated with these many (e.g., potentially millions) of unique private signature keys. DAA was created so that a device could prove to an external party what kind of device it is (and optionally what software is running on the device) without needing to provide device identity, i.e., to prove you are an authentic member of a group without revealing which member. EPID enhances DAA by providing an additional utility of being able to revoke a private key given a signature created by that key, even if the key itself is still unknown.

Figure 5:
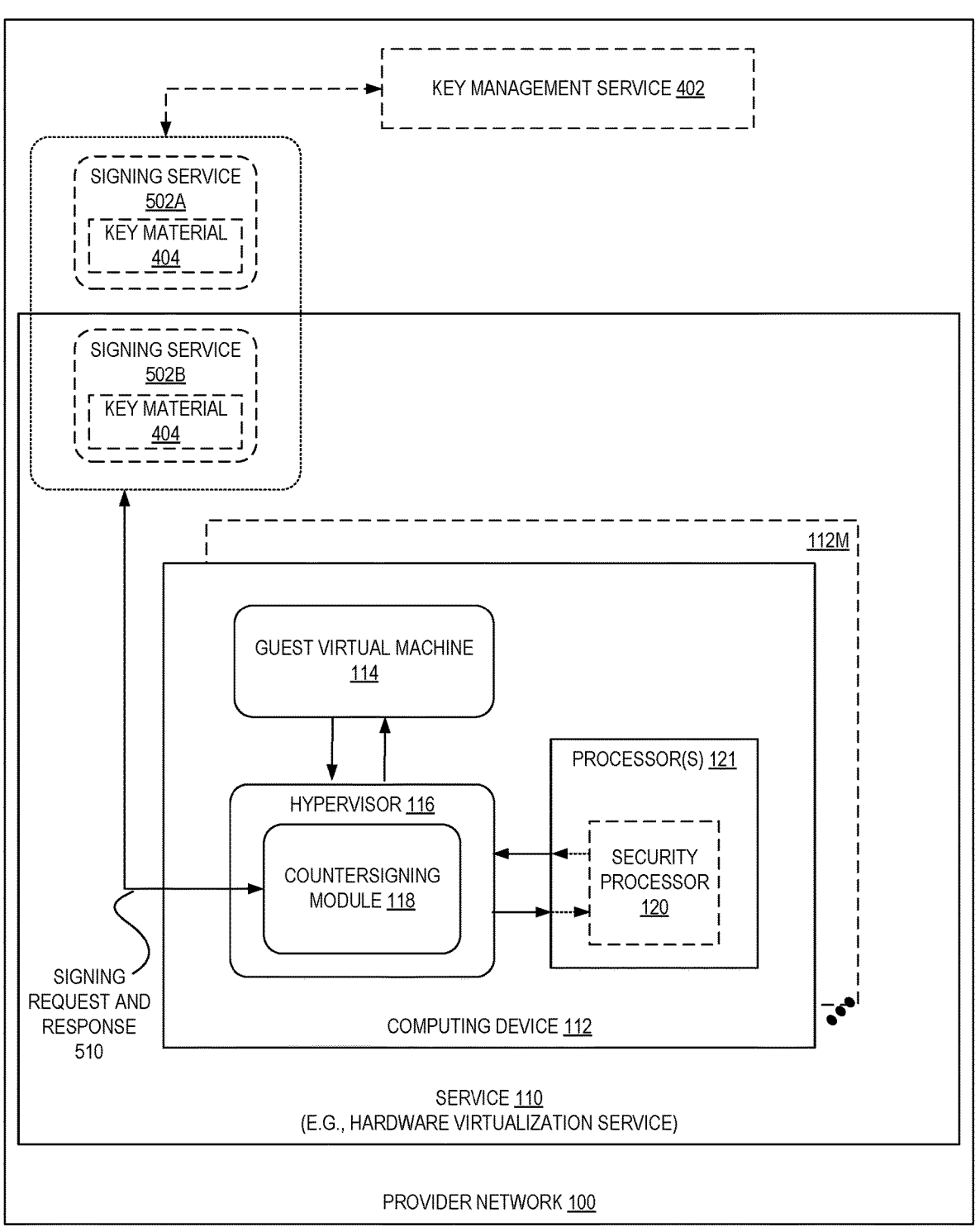
FIG. 5 is a diagram illustrating off-device cloud provider attestation signing for virtual machine attestation report enhancement via countersigning according to some examples.

However, in some examples, the countersigning module 118 of the hypervisor 116 can perform the countersigning "remotely," that is, outside of the computing device 112. FIG. 5 is a diagram illustrating off-device cloud provider attestation signing for virtual machine attestation report enhancement via countersigning according to some examples. As shown, upon needing to generate a countersigned attestation report, the countersigning module 118 can communicate (with requests/responses 510) with a signing service 502 implemented as part of the service 110 (as signing service 502B) or separate from the service 110 (as signing service 502A), which itself may have obtained key material 404 from the key management service 402. The signing service 502 can be a software application or code executed by one or more computing devices, for example, as a serverless function executed by an on-demand code execution service, as a fleet of scalable instances hosted by a hardware virtualization service, etc. In some examples, the signing service 502 will "prove" its identify to the counter-signing module 118 using techniques known to those of skill in the art, and in some examples, the countersigning module 118 may send the signed attestation report (or its hash) to the signing service 502 for signing and then receive a response including the countersigned attestation report block.

Figure 6:
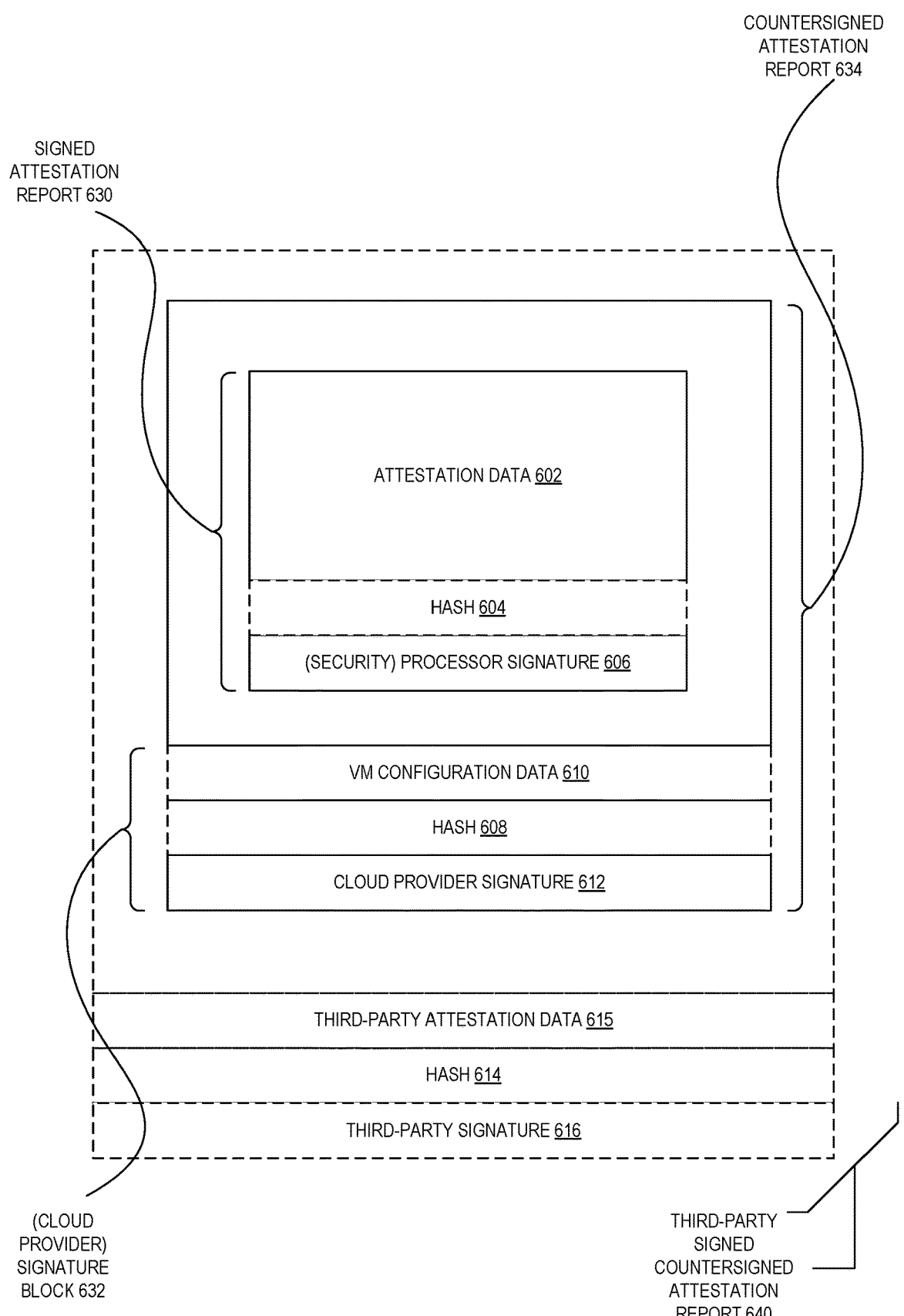
FIG. 6 is a diagram illustrating exemplary attestation data and associated signatures according to some examples.

As indicated, a variety of types of countersigned attestation report data can be generated and/or returned. FIG. 6 is a diagram illustrating exemplary attestation data 602 and associated signatures according to some examples.

In this figure, a set of attestation data 602 is shown that can include a variety of data elements associated with the guest virtual machine of interest, such as values of register state, indications of enabled or disabled services or settings, a uniqueness value (provided in an associated request to ensure uniqueness and freshness), and the like. In some examples, this attestation data 602 is signed by the security processor or processor, e.g., by generating a hash 604 of the attestation data 602 and encrypting this hash, by the security processor or processor, using its private key (e.g., associated with a vendor that made or sold the processor) to yield security processor signature 606. Collectively, these elements can collectively form a signed attestation report 630, though in some examples the hash 604 is optional (as it can potentially also be generated by a recipient and compared against a decrypted version of the security processor signature 606).

This entire signed attestation report 630—or portions thereof, possibly along with VM configuration data 610—can similarly be hashed to create hash 608. In some examples, this hash 608 is signed by the countersigning module 118 to yield a cloud provider signature 612. However, in some cases virtual machine configuration data 610 may also be combined with the hash 608 for use in generating the cloud provider signature 612, or alternatively the hash 608 may be generated based on hashing a combination of the signed attestation report 630 and virtual machine configuration data 610.

Thus, optionally, in some examples virtual machine configuration data 610 is included (with the cloud provider signature 612 and optionally the hash 608) to yield a cloud provider signature block 632. The virtual machine configuration data 610 can include a variety of types of information that the cloud provider has access to and can attest, such one or more of as a hash of the contents of the VM's disk images, metadata indicating how the guest VM is configured within the provider network (e.g., network configuration data such as a network/IP address or hostname), an instance identifier that uniquely identifies the VM in some context (perhaps uniquely within with the entire cloud provider network, or uniquely across all instances of a customer), applicable policies or users or roles associated with the VM, etc.), an indicator of geography (e.g., a country the VM is within, a region the VM is within, an AZ the VM is within, etc.).

In some examples, this countersigned attestation report 634 (including some or all of the signed attestation report 630 and (cloud provider) signature block 632 carrying the countersignature) can further be signed by a third-party (different than the countersigning module and the security processor, though either within or external to the cloud provider network 100 and maybe or maybe not operated by the cloud provider). For example, in some examples a third-party device may be deployed alongside the computing device and coupled to the computing device, e.g., via a USB type connection or similar. This computing device could provide the countersigned attestation report 634 to the third-party device, which itself could optionally provide its own attestation data 615 (e.g., a geographic coordinate, a system composition identifier, etc.), sign the countersigned attestation report 634, resulting in yet another signature (e.g., third-party signature 616) and optional hash 614 to be appended (or combined with, or provided alongside with) to yield a third-party signed countersigned attestation report 640. For example, in some arrangements a third-party component generates its own attestation data 615, generates a hash of both the countersigned attestation report 634 together with the attestation data 615, using its own key (e.g., chained back to another certificate authority), resulting in a third-party signature 616. While this example shows the addition of one such third-party signature, notably this process could repeat one or multiple more times as desired by the implementor, and thus can be countersigned by one entity or multiple entities.

FIG. 7 is a flow diagram illustrating operations 700 of a method for virtual machine attestation report enhancement via countersigning according to some examples. Some or all of the operations 700 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 700 are performed by the hypervisor 116 of the other figures.

The operations 700 include, at block 702, receiving a request to obtain a counter-signed attestation report for a virtual machine executed by a computing device. The computing device, in some examples, is part of a cloud provider network, and can be used to host virtual machine instances for users of the cloud provider network.

The operations 700 further include, at block 704, obtaining an attestation report for the virtual machine from a processor of the computing device, wherein the attestation report is signed by the processor using a first key associated with a vendor of the processor. The first key can be chained to a certificate authority associated with the vendor. The first key may be unique to the processor, or potentially used for multiple computing devices, such as a set of computing devices in a same AZ or region of a cloud provider network.

The operations 700 further include, at block 706, countersigning the attestation report using a second key to yield a signature block. The second key can be associated with an owner or manager of the computing device, such as a cloud provider, and thus may be chainable back to a certificate authority of the cloud provider.

The operations 700 further include, at block 708, providing (e.g., transmitting, storing, etc.) at least the signature block to satisfy the request.

In some examples, the providing of at least the cloud-provider signature block includes providing both the attestation report and the (cloud-provider) signature block together in a single logical response. In some examples, the request indicates that the requestor desires both the attestation report and the cloud-provider signature block. In some examples, the request is carried within a Guest Hypervisor Communication Block (GHCB) and includes a globally unique identifier (GUID) indicating that the requestor desires both the attestation report and the (cloud-provider) signature block.

In some examples, providing at least the (cloud-provider) signature block occurs by providing the signature block but not the attestation report in a single logical response. In some examples, the operations 700 further include caching data, the data comprising the signed attestation report or a hash of the signed attestation report, wherein obtaining the attestation report occurs prior to the receiving of the request, wherein caching the data occurs prior to the receiving of the request, and wherein countersigning the attestation report comprises signing the cached data.

In some examples, the operations 700 further include obtaining, by a computing device, key information for use in generating signatures of attestation reports, the key information including at least the second key, where the second key is a private key, associated with a public key, that is chained back to a certificate authority (e.g., of the cloud provider), wherein countersigning the attestation report includes use of the private key.

In some examples, the receiving of the request, the obtaining of the (signed) attestation report, the countersigning of the (signed) attestation report, and the providing of at least the signature block is performed by an offload card of the computing device, wherein the offload card is separate from the processor and implements at least some hypervisor functionalities.

In some examples, the receiving of the request, the obtaining of the attestation report, and the providing of at least the signature block is performed by a computing device that executes the virtual machine; and wherein the signing of the attestation report is performed by a separate computing device that is distinct from the computing device, which may be another service or component of a cloud provider network.

In some examples, the second key is used for signing attestation reports from multiple different computing devices.

In some examples, the signature block further includes (e.g., cloud provider) configuration data associated with the virtual machine. In some examples, the configuration data includes at least one of: a unique identifier associated with the virtual machine, network configuration data associated with the virtual machine, disk image data associated with the virtual machine, policy data of policies applied to the virtual machine; and/or geographic data associated with a location of the virtual machine.

Figure 8:
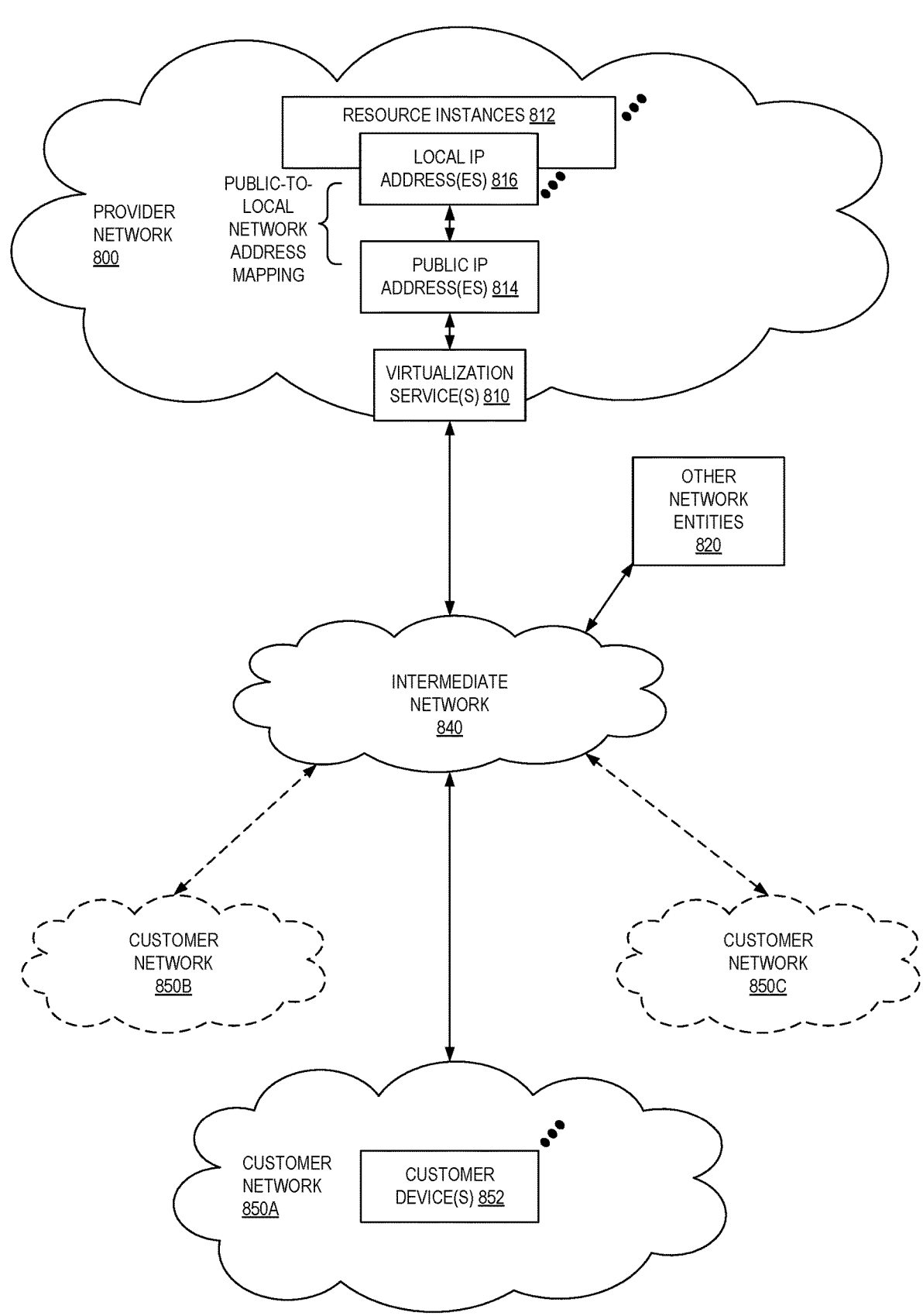
FIG. 8 illustrates an example provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
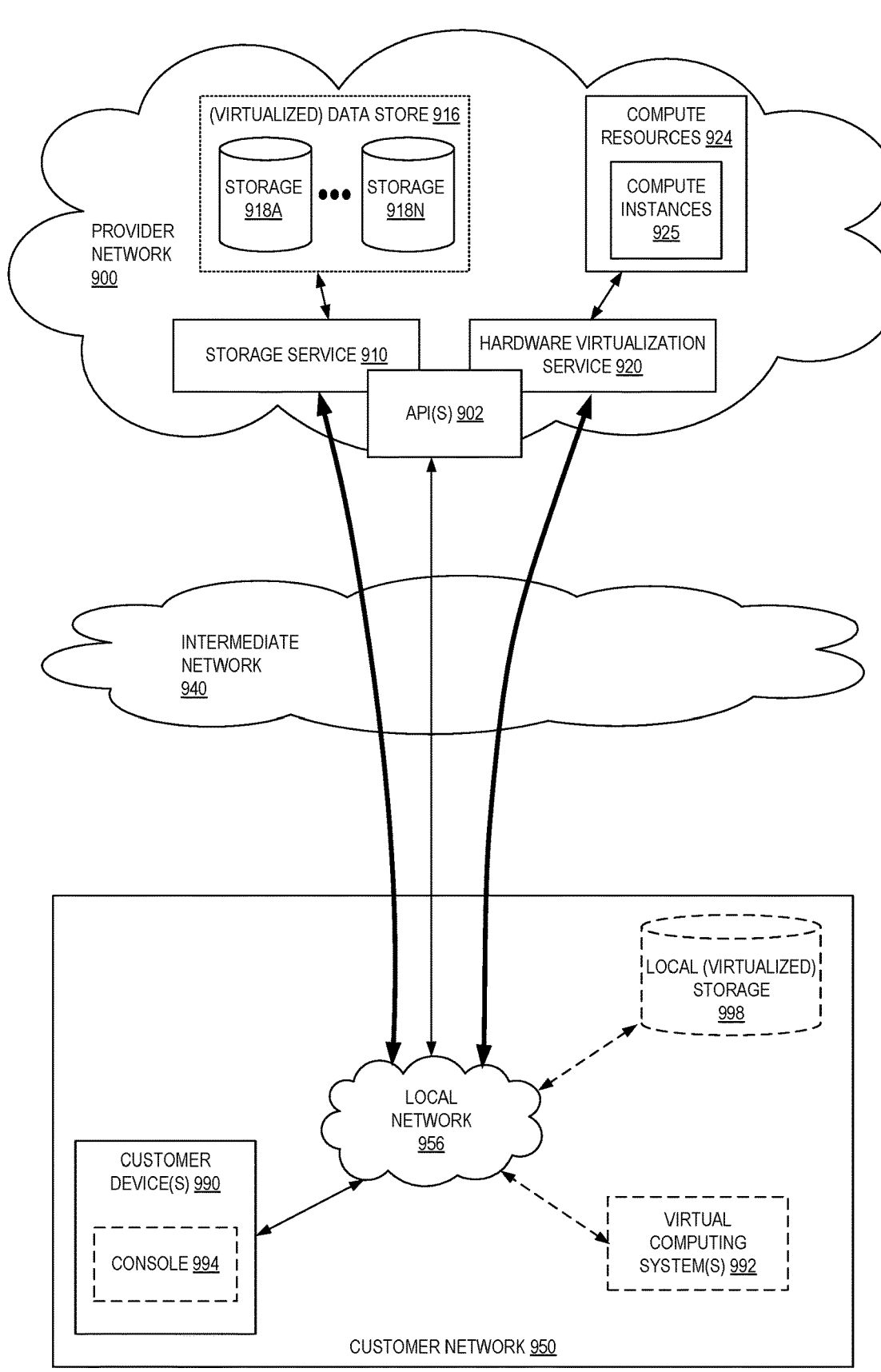
FIG. 9 is a block diagram of an example provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
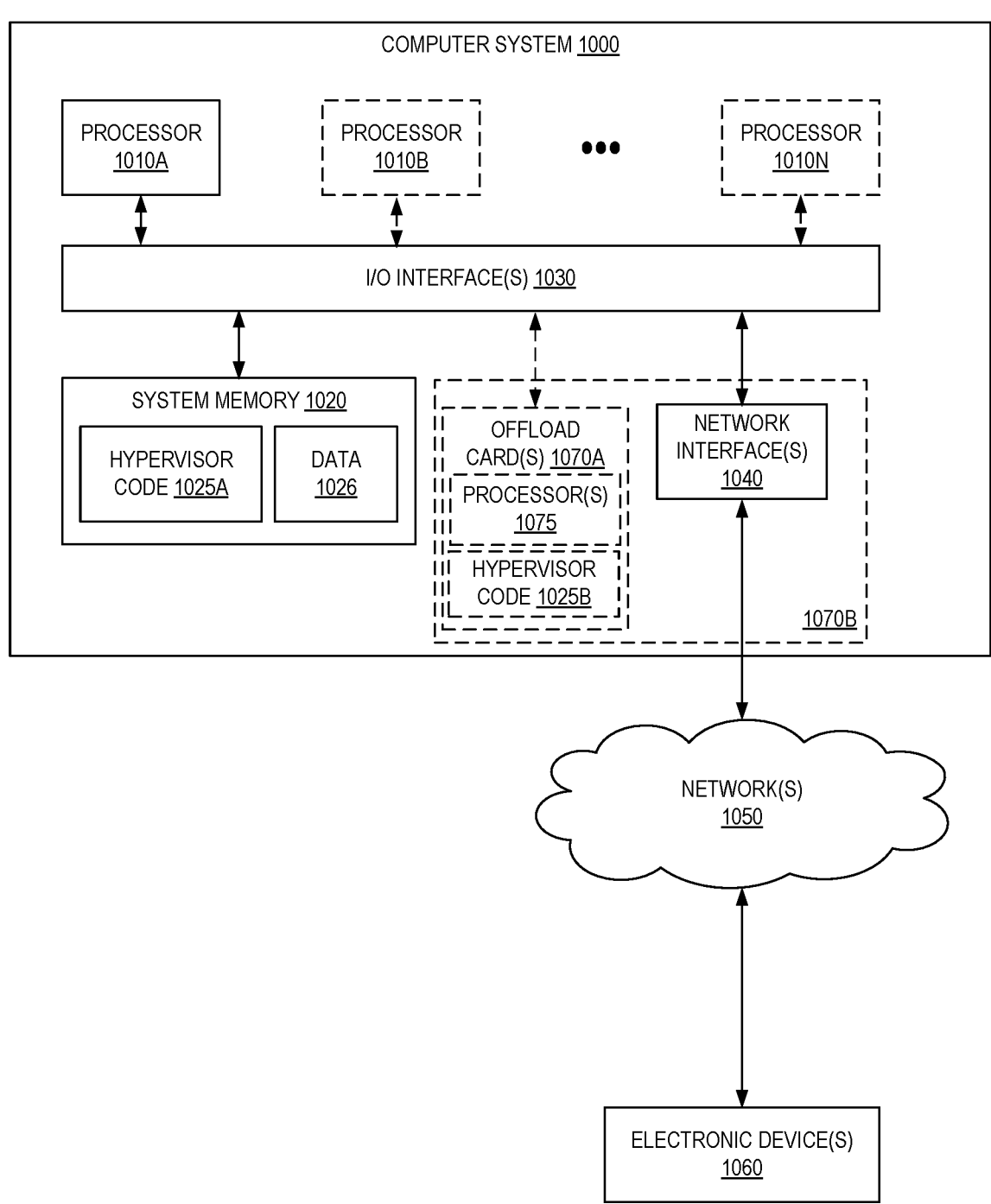
FIG. 10 is a block diagram illustrating an example computer system that can be used in some examples.

In some examples, a system that implements a portion or all of the techniques described herein can include a general-purpose computer system, such as the computer system 1000 (also referred to as a computing device or electronic device) illustrated in FIG. 10, that includes, or is configured to access, one or more computer-accessible media. In the illustrated example, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various examples the computer system 1000 can include one computing device or any number of computing devices configured to work together as a single computer system 1000.

In various examples, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as hypervisor code 1025A (e.g., executable to implement, in whole or in part, the hypervisor 116) and data 1026. In some examples, this hypervisor code 1025 may also (or alternatively) be stored in a memory within an offload card 1070A as hypervisor code 1025B, such as when the offload card 1070A implements some or all of the hypervisor 116 functionality.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect—Express (PCI-E) standard, or another interconnect such as a QuickPath interconnect (QPI) or UltraPath interconnect (UPI)). For example, in some examples the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A–1010N of the computer system 1000. However, in some examples the virtualization manager implemented by the offload card(s) 1070A or 1070B can accommodate requests from other entities (e.g., from compute instances themselves), and can not coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving, by a hypervisor component of a computing device within a cloud provider network, a request to obtain a counter-signed attestation report for a guest virtual machine, wherein the request was originated by the guest virtual machine executing on the computing device;
   sending, by the hypervisor component, a request for an attestation report to a security processor of the computing device;
   receiving, by the hypervisor component, the attestation report from the security processor, wherein the attestation report is signed by the security processor based on use of a first key associated with a vendor of the security processor;
   countersigning, by the hypervisor component, the attestation report via use of a second key associated with the cloud provider network to yield a cloud-provider signature block; and
   providing the attestation report and the cloud-provider signature block in a response to the request back to the guest virtual machine.

2. The computer-implemented method of claim 1, wherein the request is carried within a Guest Hypervisor Communication Block (GHCB) and includes a globally unique identifier (GUID) indicating that the requestor desires both the attestation report and the cloud-provider signature block.

3. The computer-implemented method of claim 1, further comprising:
   receiving, by the computing device, key information for use in generating cloud-provider signatures of attestation reports, the key information including at least the second key, wherein the second key is a private key, associated with a public key, that is chained back to a certificate authority of the cloud provider.

4. A computer-implemented method comprising:
   receiving a request to obtain a counter-signed attestation report for a virtual machine executed by a computing device within a network of a service provider;
   obtaining an attestation report for the virtual machine from a processor of the computing device, wherein the attestation report comprises attestation data indicative of an initial state of the virtual machine and is signed by the processor using a first key, wherein the first key is a vendor key associated with a vendor of the processor;
   countersigning the attestation report using a second key to yield a signature block, wherein second key is a provider key associated with the service provider, and wherein the vendor key and the provider key are cryptographically independent; and
   transmitting or storing at least the signature block to satisfy the request.

5. The computer-implemented method of claim 4, wherein transmitting or storing at least the signature block includes providing both the attestation report and the signature block together in a single logical response.

6. The computer-implemented method of claim 5, wherein the request indicates that the requestor desires both the attestation report and the signature block.

7. The computer-implemented method of claim 6, wherein the request is carried within a Guest Hypervisor Communication Block (GHCB) and includes a globally unique identifier (GUID) indicating that the requestor desires both the attestation report and the signature block.

8. The computer-implemented method of claim 4, wherein transmitting or storing at least the signature block occurs by providing the signature block but not the attestation report in a single logical response.

9. The computer-implemented method of claim 8, further comprising:
   caching data, the data comprising the attestation report or a hash of the attestation report,
   wherein obtaining the attestation report occurs prior to the receiving of the request,
   wherein caching the data occurs prior to the receiving of the request, and
   wherein countersigning the attestation report comprises signing the cached data using the second key.

10. The computer-implemented method of claim 4, further comprising:
   obtaining, by the computing device, key information for use in generating signatures of attestation reports, the key information including at least the second key, wherein the second key is a private key, associated with a public key, that is chained back to a certificate authority,
   wherein the countersigning of the attestation report is performed by the computing device.

11. The computer-implemented method of claim 10, wherein the receiving of the request, the obtaining of the attestation report, the countersigning of the attestation report, and the transmitting or storing of at least the signature block is performed by an offload card of the computing device, wherein the offload card is separate from the processor and implements at least some hypervisor functionality.

12. The computer-implemented method of claim 4, wherein:
   the receiving of the request, the obtaining of the attestation report, and the transmitting or storing of at least the signature block is performed by the computing device that executes the virtual machine; and
   wherein the countersigning of the attestation report is performed by a separate computing device that is distinct from the computing device.

13. The computer-implemented method of claim 4, wherein the second key is used for countersigning attestation reports from multiple different computing devices.

14. The computer-implemented method of claim 4, wherein the signature block further includes cloud provider configuration data associated with the virtual machine.

15. The computer-implemented method of claim 14, wherein the cloud provider configuration data includes at least one of:
   a unique identifier associated with the virtual machine;
   network configuration data associated with the virtual machine,
   disk image data associated with the virtual machine,
   policy data of policies applied to the virtual machine; or
   geographic data associated with a location of the virtual machine.

16. A system comprising:

a first one or more electronic devices configured to implement a key management service in a multi-tenant cloud provider network; and a computing device of a second one or more electronic devices of a hardware virtualization service in the multi-tenant cloud provider network, the computing device including instructions that upon execution cause the computing device to:

receive a request to obtain a counter-signed attestation report for a virtual machine executed by the computing device;

obtain an attestation report from a processor of the computing device, wherein the attestation report comprises attestation data indicative of an initial state of the virtual machine and is signed by the processor using a first key, wherein the first key is a vendor key associated with a vendor of the processor;

countersign the attestation report using a second key to yield a cloud-provider signature block, wherein the second key is a provider key associated with the cloud provider; and transmit or store at least the cloud-provider signature block in satisfaction of the request.

17. The system of claim 16, wherein the computing device is to provide at least the cloud-provider signature block via providing both the attestation report and the cloud-provider signature block together in a single logical response.

18. The system of claim 17, wherein the request indicates that the requestor desires both the attestation report and the cloud-provider signature block.

19. The system of claim 18, wherein the request is carried within a Guest Hypervisor Communication Block (GHCB) and includes a globally unique identifier (GUID) indicating that the requestor desires both the attestation report and the cloud-provider signature block.

20. The system of claim 16, wherein the computing device is to provide at least the cloud-provider signature block via providing the cloud-provider signature block but not the attestation report in a single logical response.

* * * * *